United States Patent [19]

Wannagot et al.

[11] Patent Number: 5,225,932
[45] Date of Patent: Jul. 6, 1993

[54] EYECUP INSERT FOR NIGHT VISION GOGGLES

[75] Inventors: Gary A. Wannagot, Mesa; Roland M. Morley, Tempe, both of Ariz.

[73] Assignee: Litton Systems, Inc., Beverly Hills, Calif.

[21] Appl. No.: 908,301

[22] Filed: Jul. 2, 1992

[51] Int. Cl.$^5$ .............................................. G02B 21/00
[52] U.S. Cl. ................................. 359/611; 359/612; 359/408; 354/287; 2/426
[58] Field of Search ............... 359/611, 612, 827, 828, 359/830, 375, 407, 408, 409, 894; 354/187, 189, 287; 2/426, 428, 431

[56] References Cited

U.S. PATENT DOCUMENTS

| | | | |
|---|---|---|---|
| 2,350,110 | 5/1944 | Hood | 359/612 |
| 3,379,485 | 4/1968 | Steisslinger | 359/611 |
| 3,701,582 | 10/1972 | Koch | 354/287 |
| 3,738,238 | 6/1973 | Hager | 354/287 |
| 4,295,706 | 10/1981 | Frost | 359/611 |
| 4,381,892 | 5/1983 | Someya | 354/287 |
| 4,526,440 | 7/1985 | Lundberg et al. | 359/827 |
| 4,687,312 | 8/1987 | Navarro | 354/287 |
| 4,698,857 | 10/1987 | Kastendieck et al. | 2/426 |

*Primary Examiner*—Loha Ben
*Attorney, Agent, or Firm*—Poms, Smith, Lande & Rose

[57] ABSTRACT

An eyecup insert is provided which allows easy attachment and removal of an eyecup from an associated night vision goggle. The eyecup provides a light secure seal when pressed against the head of an operator of the goggle. A connecting end of the eyecup has annular channel which engages the insert. The insert is ring shaped with a central aperture having a plurality of detents protruding inwardly of the aperture. The operator can form a snap-fit connection between the eyecup and the goggle by forcing the aperture over a circular flange which surrounds an eyepiece of the goggle until the detents have snapped passed the flange. The eyecup can be removed by reversing the installation procedure.

20 Claims, 2 Drawing Sheets

EYECUP INSERT FOR NIGHT VISION GOGGLES

BACKGROUND OF THE INVENTION

1. Field of the Invention

The present invention relates to night vision systems, and more particularly, to an insert for an eyecup of a night vision goggle which enables the eyecup to be removably secured to the goggle.

2. Description of Related Art

Night vision systems are commonly used by military and law enforcement personnel for conducting operations in low light or night conditions. These systems comprise goggles employing an image intensification process which amplifies the ambient light reflected or emitted by an observed object. The image intensification process involves conversion of the received ambient light into electron patterns and projection of the electron patterns onto a phosphor screen for conversion of the electron patterns into light visible to the observer. This visible light is then viewed by the operator through a lens provided in the eyepiece of the goggle.

It is necessary to prevent others from seeing the light emitted from the phosphor screen through the eyepiece, otherwise the night vision system would inadvertently give away the position of the operator. To accomplish this, the eyepiece is typically shrouded by an eyecup which surrounds the eyepiece. The typical eyecup adapts to the eyepiece of the night vision system, and has a bell-shaped portion which fits around the operator's eye. A flexible material, such as rubber, is commonly used to form the eyecup. The eyecup may also have a bellows portion which enables the shape of the eyecup to be easily deformed to adapt the goggle for each particular operator. A typical eyecup is disclosed in U.S. Pat. No. 4,698,857, issued to Kastendieck et al ("the '857 patent").

One drawback of the typical eyecup involves its attachment to the eyepiece. In the '857 patent, an internal annular groove and ridge are provided at the connecting end of the eyecup. The ridge is stretched over an external flange provided on the eyepiece, so that the flange seats in the groove. It is necessary to insure that the external flange completely engages the annular groove, otherwise the eyecup could become inadvertently dislodged from the goggle, greatly increasing the risk of someone seeing the light emitted from the eyepiece.

The elasticity of the rubber material is advantageous in that it readily conforms to the shape of the operator's face to form a light secure seal. However, a degree of design flexibility is lost by the choice of material to mate with the flange of the eyepiece. Since the annular groove and ridge are directly molded into the rubber eyecup material, the eyecup cannot be easily adapted to different size eyepieces. The diameter of the eyepieces can differ significantly to accommodate different power lenses. Thus, each size eyepiece requires a uniquely designed eyecup. Furthermore, rubber does not have good environmental, temperature and durability characteristics in comparison to other materials which could be used to form the connection between the eyepiece and the eyecup.

An additional problem with the prior art eyecup is that it can be cumbersome to remove and install the eyecup from the eyepiece of the night vision system. An operator may occasionally need to remove the eyecup from its attachment with the night vision system so as to clean the lens or the eyecup itself. Since this operation would typically occur at night, it could be difficult for the operator to manipulate the eyecup onto the attachment flange. The soft rubber material of the eyecup would not provide any tactile response to the operator confirming that the attachment has been properly made.

Thus, it would be desirable to provide an eyecup having an insert of an alternative material for attachment to the associated eyepiece of a night vision system. It would also be desirable to provide an eyecup which is easy to install and remove from an eyepiece of a night vision system, and which provides tactile feedback to the operator informing that the attachment is properly made. It would be further desirable to provide an insert for an eyecup which enables the eyecup to interface with varying size flanges typically provided on an eyepiece of a night vision system.

SUMMARY OF THE INVENTION

Accordingly, a principal object of the present invention is to provide an eyecup having an insert of an alternative material for attachment with the associated eyepiece of a night vision goggle.

Another object of the present invention is to provide an eyecup which is easy to install and remove from an eyepiece of a night vision goggle, and which provides tactile feedback to the operator informing that the attachment is properly made.

Yet another object of the present invention to provide an insert for an eyecup which enables the eyecup to interface with varying size flanges typically provided on an eyepiece of a night vision goggle.

To achieve the foregoing objects and in accordance with the purpose of the invention, an eyecup is provided for use with a night vision goggle to provide a light secure seal when pressed against the head of an operator. The eyecup comprises a connecting end having an annular channel. A semi-rigid insert ring engages the channel, and has a central aperture with a plurality of detents protruding inwardly of the aperture. A snap-fit connection is formed between the eyecup and the goggle by forcing the aperture over a circular flange which surrounds an eyepiece of the goggle until the detents have snapped passed the flange.

In another embodiment of the present invention, an eyecup insert for attaching an eyecup to an eyepiece of a night vision goggle is provided. The insert comprises a semi-rigid ring which engages a first pleat of a bellows portion of the eyecup. The ring has a central aperture with a plurality of detents protruding inwardly of the aperture. A snap-fit connection is formed between the eyecup and the eyepiece by forcing the aperture over a circular flange surrounding the eyepiece until the detents have snapped passed the flange.

A more complete understanding of the eyecup for a night vision goggle of the present invention will be afforded to those skilled in the art, as well as a realization of additional advantages and objects thereof, by a consideration of the following Detailed Description of the Preferred Embodiment. Reference will be made to the appended sheets of drawings which will be first described briefly.

DETAILED DESCRIPTION OF THE PREFERRED EMBODIMENT

Figure 1:
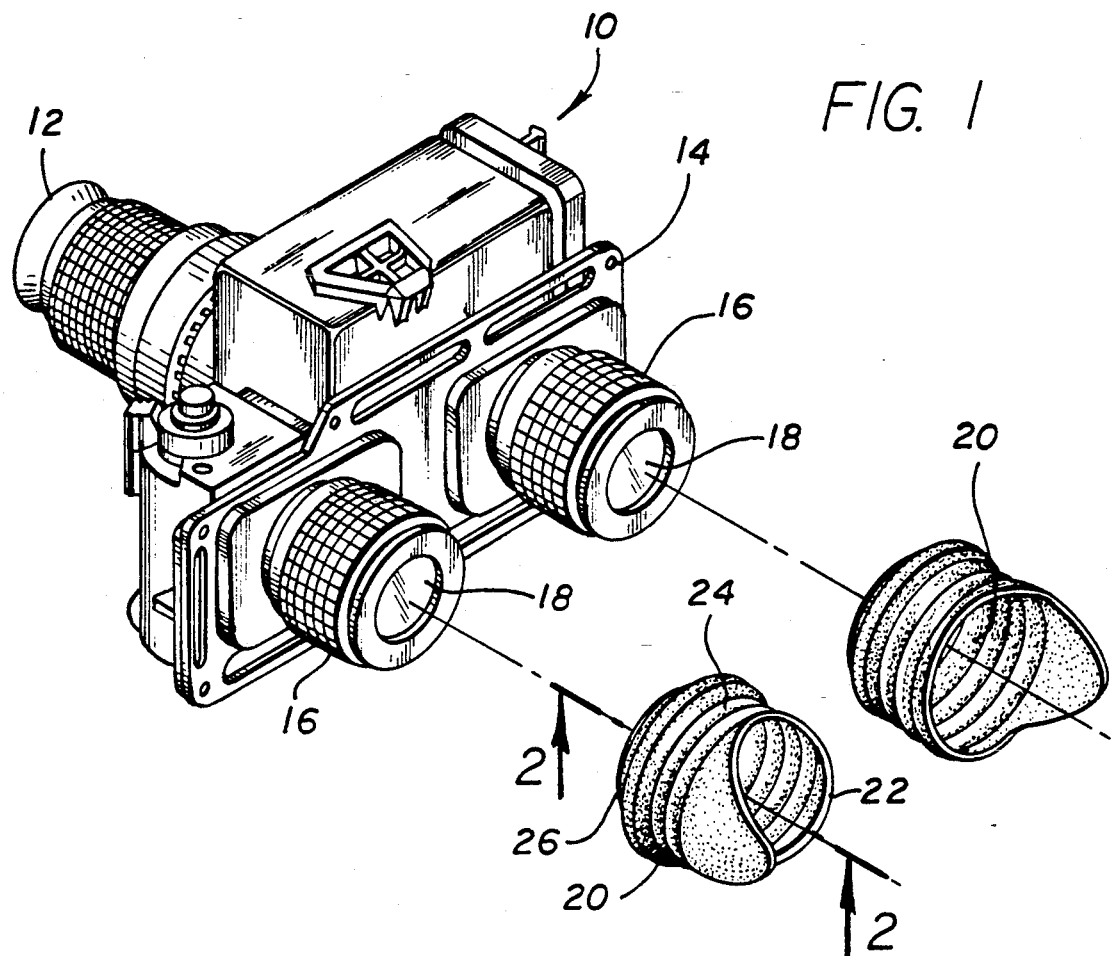
FIG. 1 is a perspective view of a night vision goggle having a pair of eyecups of the present invention.

Referring first to FIG. 1 there is shown a typical night vision goggle 10 which has an objective lens 12, a housing portion 14 and a pair of eyepieces 16. Ambient light either reflected or emitted from an observed scene enters the objective lens and is enhanced by an image intensification tube within the housing portion 14. The enhanced image is projected onto a phosphor screen (not shown) which can be viewed by the operator looking through the eyepieces 16. Although the night vision goggle 10 of FIG. 1 is a binocular device having two eyepieces, monocular systems having only one eyepiece are also widely used.

An eyecup 20 attaches to each of the eyepieces 16. The eyecup 20 has an end portion 22 which surrounds the operator's eye, an intermediate portion 24, and a portion 26 which attaches to the eyepiece 16. The end portion has a curvature designed to fit around the operator's eye, to form a light secure seal with the operator's face. This seal prevents any light from inadvertently escaping, which can be seen by potentially hostile forces. The intermediate portion 24 has a generally bellows shape, which allows for compression of the eyecup 20 as it is pressed against the operator's face. The connecting portion 26 is generally cylindrical, and will be fully described below. The eyecup 20 is formed from a highly flexible material, such as rubber, which is black in color to reduce its tendency to reflect light.

Figure 4:
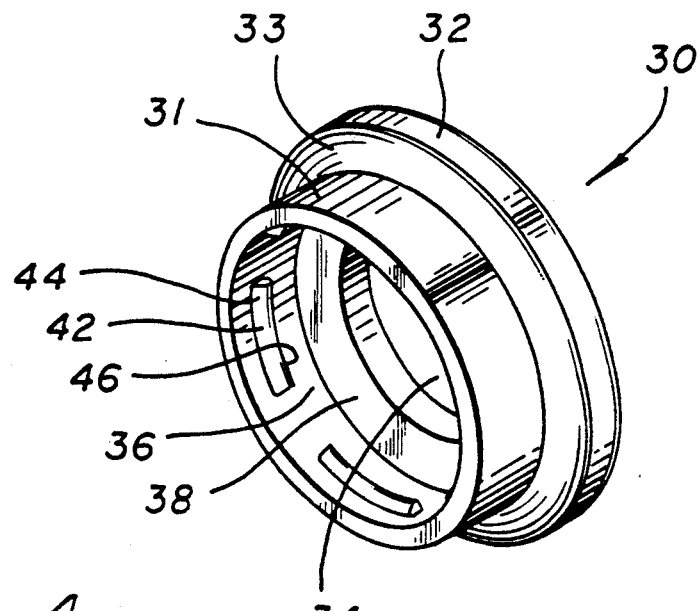
FIG. 4 is a perspective view of the eyecup insert.

The connecting portion 26 of the eyecup 20 receives an insert ring 30, best shown in FIG. 4. The ring 30 is formed from a semi-rigid material, such as plastic, which is firm enough to maintain its shape while remaining somewhat pliable. The ring material can be selected to maximize environmental, temperature and durability requirements of the particular night vision goggle. The ring 30 has a cylindrical portion 31 and a collar portion 32 which extends outwardly relative the cylindrical portion. The collar portion 32 has generally tapered side walls 33. The ring 30 further has a central aperture 34 which permits the light from the eye piece 16 to be seen through the eyecup 20. The cylindrical portion 31 has an inside diameter somewhat larger than that of the central aperture 34, with a seating wall 38 forming a demarcation between the cylindrical portion 31 and the central aperture 34. A plurality of detents 42 are evenly spaced around the circumference of the inside diameter of the cylindrical portion 31. The detents 42 each have a rounded leading edge 44 and a steeper trailing edge 46. A receiving groove 36 is formed by the space between the trailing edge 46 of the detents 42 and the seating wall 38.

Figure 2:
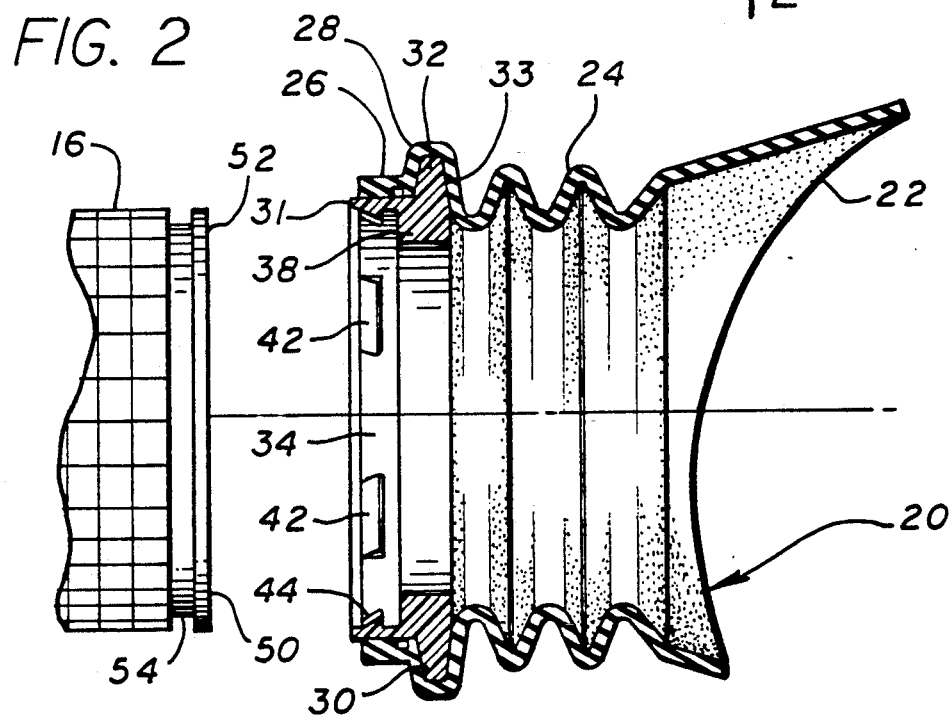
FIG. 2 is a cross-sectional side view of the eyecup and insert adjacent to an eyepiece of the goggle, as taken through the section 2—2 of FIG. 1.
Figure 3:
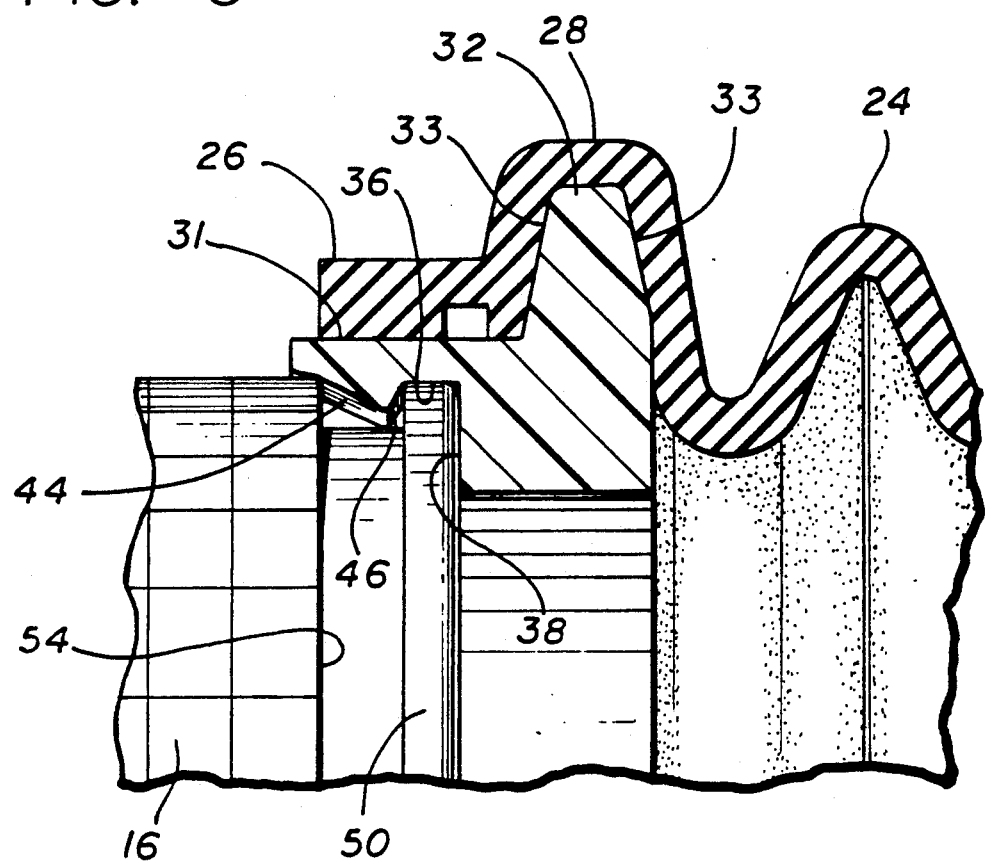
FIG. 3 is an enlarged cross-sectional side view as in FIG. 2, with the eyecup insert secured to a flange surrounding the eyepiece.

Permanently secured to each of the eyepieces 16, are eyepiece flanges 50, shown in FIG. 2. The flanges 50 have a facing surface 52 which faces in the general direction of the eyepieces 16. A gap 54 is provided between the flange 50 and the eyepiece 16. The diameter of the flange 50 is equivalent to the inside diameter of the cylindrical portion 31. The flanges 50 are also formed from a semirigid material, such as plastic.

The insert ring 30 engages the attaching end 26 of the eyecup 20 so that the collar 32 fully extends into a first pleat 28 of the intermediate portion 24. The collar 32 is slightly larger than the pleat 28, requiring the elastic material of the eyecup 20 to stretch in order to conform to the shape of the collar. Once the insert ring 30 has been installed at the attaching end 26 of the eyecup 20, it would remain rigidly held in place by the compressive force of the elastic material. If desired, however, the insert ring 30 can be removed by stretching the elastic material of the eyecup 20 over the collar 32.

Once the insert ring 30 has been installed in the eyecup 20, the eyecup 20 is ready to be attached to the eyepiece 16 of the night vision goggle 10. The attaching end 26 of the eyecup is positioned relative to the flange 50, and the insert ring 30 is forced over the flange until the flange snaps over the detents 42. The flange 50 would then come to rest in the receiving groove 36 between the trailing edge 46 of the detents 42 and the seating wall 38. The detents 42 deform slightly while the flange 50 is being forced into position, but quickly return to their initial shape, holding the flange in position. If desired, the eyecup 20 can be subsequently removed from the eyepiece 16 by reversing the attaching procedure described above.

It should be apparent that an operator can easily install or remove the eyecup 20 from the eyepiece 16 during conditions of darkness. The operator would receive a tactile sensation when the flange 50 snaps into the receiving groove 36. By hearing or feeling the snap of the flange 50 seating properly within the insert ring 30, the operator knows that a proper attachment has been made.

Having thus described a preferred embodiment of an eyecup for an night vision system, it should now be apparent to those skilled in the art that the aforestated objects and advantages for the within system have been achieved. It should also be appreciated by those skilled in the art that various modifications, adaptations and alternative embodiment thereof may be made within the scope and spirit of the present invention. For example, inserts having varying size apertures can be provided to adapt a single eyecup with different size eyepieces.

The present invention is further defined by the following claims.

What is claimed is:

1. A night vision system, comprising:
   a goggle having an eyepiece for viewing an image, and a circular flange surrounding the eyepiece;
   an eyecup having a connecting end for attachment to said eyepiece, a sealing end for providing a seal when pressed against the head of an operator to prevent leakage of light from said eyepiece, and an annular channel between said connecting end and said sealing end; and
   an insert ring which engages said annular channel, said ring having a central aperture with a plurality of detents protruding inwardly of said aperture;
   wherein, a snap-fit connection is formed between said eyecup and said eyepiece by forcing said aperture over said flange until said detents have snapped passed said flange.

2. The night vision system of claim 1, wherein said system includes means for securing said eyecup to said goggle by the engagement of said detents with said flange.

3. The night vision system of claim 2, wherein;

said insert ring comprises a collar portion having radially extending sidewalls of a diameter greater than said channel, said sidewalls engaging said channel by intentionally stretching said eyecup;

wherein, compressive force of said eyecup maintains engagement between said insert ring and said eyecup.

4. The night vision system of claim 3, wherein:

said eyecup has a bellows portion between said connecting end and said sealing end, said bellows portion comprising a plurality of pleats, a first one of said pleats providing said annular channel.

5. The night vision system of claim 4, wherein:

said insert ring further comprises an inwardly extending seating wall adjacent to said detents, and a receiving groove formed between said detents and said seating wall, said flange engaging said receiving groove when said snap-fit connection is formed.

6. The night vision system of claim 5, wherein said insert ring is formed from a semi-rigid material.

7. An eyecup for use with a goggle to provide a light secure seal when pressed against the head of an operator, the eyecup comprising:

a connecting end and an annular channel; and an insert ring which engages said channel, said ring having a central aperture with a plurality of detents protruding inwardly of said aperture;

wherein, a snap-fit connection is formed between said eyecup and said goggle by forcing said aperture over a circular flange surrounding an eyepiece of said goggle until said detents have snapped passed said flange.

8. The eyecup of claim 7, wherein;

said insert ring comprises a collar portion having radially extending sidewalls of a diameter greater than said channel, said sidewalls engaging said channel by intentionally stretching said eyecup;

wherein, compressive force of said eyecup maintains engagement between said insert ring and said eyecup.

9. The eyecup of claim 8, wherein:

said eyecup has a bellows portion comprising a plurality of pleats, a first one of said pleats providing said channel.

10. The eyecup of claim 9, wherein:

said insert ring further comprises an inwardly extending seating wall adjacent to said detents, and a receiving groove formed between said detents and said seating wall, said flange engaging said receiving groove when said snap-fit connection is formed.

11. The eyecup of claim 10, wherein said detents have a generally rounded leading edge.

12. The eyecup of claim 11, wherein said insert ring is formed from a semi-rigid material.

13. The eyecup of claim 12, wherein said eyecup is formed from a flexible material.

14. An eyecup insert for attaching an eyecup to an eyepiece of a night vision goggle, the insert comprising:

a ring which engages an annular channel provided in said eyecup, said ring having a central aperture with a plurality of detents protruding inwardly of said aperture;

wherein, a snap-fit connection is formed between said eyecup and said eyepiece by forcing said aperture over a circular flange surrounding said eyepiece until said detents have snapped passed said flange.

15. The eyecup insert of claim 14, wherein;

said ring comprises a collar portion having radially extending sidewalls of a diameter greater than said channel, said sidewalls engaging said channel by intentionally stretching said eyecup;

wherein, compressive force of said eyecup maintains engagement between said insert ring and said eyecup.

16. The eyecup insert of claim 15, wherein:

said eyecup has a bellows portion comprising a plurality of pleats, a first one of said pleats providing said channel.

17. The eyecup insert of claim 16, wherein:

said ring further comprises an inwardly extending seating wall adjacent to said detents, and a receiving groove formed between said detents and said seating wall, said flange engaging said receiving groove when said snap-fit connection is formed.

18. The eyecup insert of claim 17, wherein said detents have a generally rounded leading edge.

19. The eyecup insert of claim 18, wherein said ring is formed from a semi-rigid material.

20. The eyecup insert of claim 19, wherein said eyecup is formed from a flexible material.

* * * * *